US010701615B2

(12) United States Patent
Grayson et al.

(10) Patent No.: US 10,701,615 B2
(45) Date of Patent: Jun. 30, 2020

(54) SYSTEM AND METHOD TO FACILITATE UNEQUAL COST MULTIPATH ROUTING IN A NETWORK ENVIRONMENT

(71) Applicant: CISCO TECHNOLOGY, INC., San Jose, CA (US)

(72) Inventors: Mark Grayson, Maidenhead (GB); James Paul Seymour, Long Grove, IL (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 15/413,067

(22) Filed: Jan. 23, 2017

(65) Prior Publication Data

US 2018/0213461 A1 Jul. 26, 2018

(51) Int. Cl.
*H04W 40/04* (2009.01)
*H04L 12/721* (2013.01)
(Continued)

(52) U.S. Cl.
CPC ......... *H04W 40/04* (2013.01); *H04L 43/0882* (2013.01); *H04L 45/123* (2013.01);
(Continued)

(58) Field of Classification Search
CPC . H04W 40/04; H04W 43/0882; H04W 40/12; H04W 84/042; H04W 84/12; H04L 45/123; H04L 45/24
See application file for complete search history.

(56) References Cited

U.S. PATENT DOCUMENTS 6,721,800 B1 * 4/2004 Basso .................... H04L 45/00
709/239
2012/0188894 A1 * 7/2012 Huschke ............... H04L 1/0002
370/252
(Continued)

FOREIGN PATENT DOCUMENTS

WO 2012167184 A2 12/2012

OTHER PUBLICATIONS

Wikipedia, Weighted Arithmetic Mean, https://en.wikipedia.org/wiki/Weighted_arithmetic_mean (archived: Jun. 10, 2013) (Year: 2013).*

(Continued)

*Primary Examiner* — Michael Thier
*Assistant Examiner* — Brian P Cox
(74) *Attorney, Agent, or Firm* — Patterson + Sheridan, LLP

(57) ABSTRACT

An example method is provided in one example embodiment and may include determining a first routing metric associated with a first communication network, wherein the first routing metric identifies a capability of the first communication network to handle an Internet Protocol (IP) flow for a user equipment (UE); determining a second routing metric associated with a second communication network, wherein the second routing metric identifies a capability of the second communication network to handle the IP flow for the UE and wherein the second routing metric is different from the first routing metric; and routing the IP flow for the UE using the first communication network or the second communication network based, at least in part, on the first routing metric and the second routing metric.

20 Claims, 7 Drawing Sheets

(51) Int. Cl.
*H04W 40/12* (2009.01)
*H04L 12/26* (2006.01)
*H04L 12/707* (2013.01)
*H04W 84/04* (2009.01)
*H04W 84/12* (2009.01)

(52) U.S. Cl.
CPC ............ *H04L 45/24* (2013.01); *H04W 40/12* (2013.01); *H04W 84/042* (2013.01); *H04W 84/12* (2013.01)

(56) References Cited

U.S. PATENT DOCUMENTS

| | | | | |
|---|---|---|---|---|
| 2013/0077482 | A1* | 3/2013 | Krishna | H04W 36/22 370/230 |
| 2014/0341109 | A1* | 11/2014 | Cartmell | H04L 45/308 370/328 |
| 2016/0338068 | A1* | 11/2016 | Cheng | H04W 88/06 |
| 2017/0135147 | A1* | 5/2017 | Belghoul | H04W 76/36 |
| 2018/0027438 | A1* | 1/2018 | Wu | H04W 76/16 370/338 |
| 2018/0184311 | A1* | 6/2018 | Fiaschi | H04W 76/00 |

OTHER PUBLICATIONS

"3GPP TS 25.321 V13.2.0 (Mar. 2016) Technical Specification: 3rd Generation Partnership Project; Technical Specification Group Radio Access Network; Medium Access Control (MAC) protocol specification (Release 13)," 3GPP, 650 Route des Lucioles—Sophia Antipolis Valbonne—France; 213 pages.

"3GPP TS 36.214 V13.3.0 (Sep. 2016) Technical Specification: 3rd Generation Partnership Project; Technical Specification Group Radio Access Network; Evolved Universal Terrestrial Radio Access (E-UTRA); Physical layer; Measurements (Release 13)," 3GPP, 650 Route des Lucioles—Sophia Antipolis Valbonne—France; 20 pages.

"3GPP TS 36.300 V13.5.0 (Sep. 2016) Technical Specification: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP, 650 Route des Lucioles—Sophia Antipolis Valbonne—France; 313 pages.

"3GPP TS 36.314 V13.1.0 (Mar. 2016) Technical Specification: 3rd Generation Partnership Project; Technical Specification Group Radio Access Network; Evolved Universal Terrestrial Radio Access (E-UTRA); Layer 2—Measurements (Release 13)," 3GPP, 650 Route des Lucioles—Sophia Antipolis Valbonne—France; 23 pages.

PCT Notice of Transmittal of the International Search Report And The Written Opinion of the International Searching Authority, or the Declaration for Application No. PCT/US2018/013766 dated Apr. 17, 2018.

Shankar R et al: "Quality of service analysis of interworking WLAN and UMTS networks coupled in three architectures", 2014 International Conference on Communication and Signal Processing, IEEE, Apr. 3, 2014 (Apr. 3, 2014), pp. 1769-1772, XP032680221, DOI: 10.1109/ICCSP.2014.6950150 ISBN: 978-1-4799-3357-0 [retrieved on Nov. 7, 2014].

PCT Written Opinion of The International Searching Authority for Application No. PC/US2018/013766 dated Jan. 16, 2018.

Carpenter, B., et al., "Using the IPv6 Flow Label for Equal Cost Multipath Routing and Link Aggregation in Tunnels," Internet Engineering Task Force RFC 6438, Nov. 2011; 9 pages.

Thaler, D., et al., "Multipath Issues in Unicast and Multicast Next-Hop Selection," Network Working Group RFC 2991, Nov. 2000; 9 pages.

* cited by examiner

100

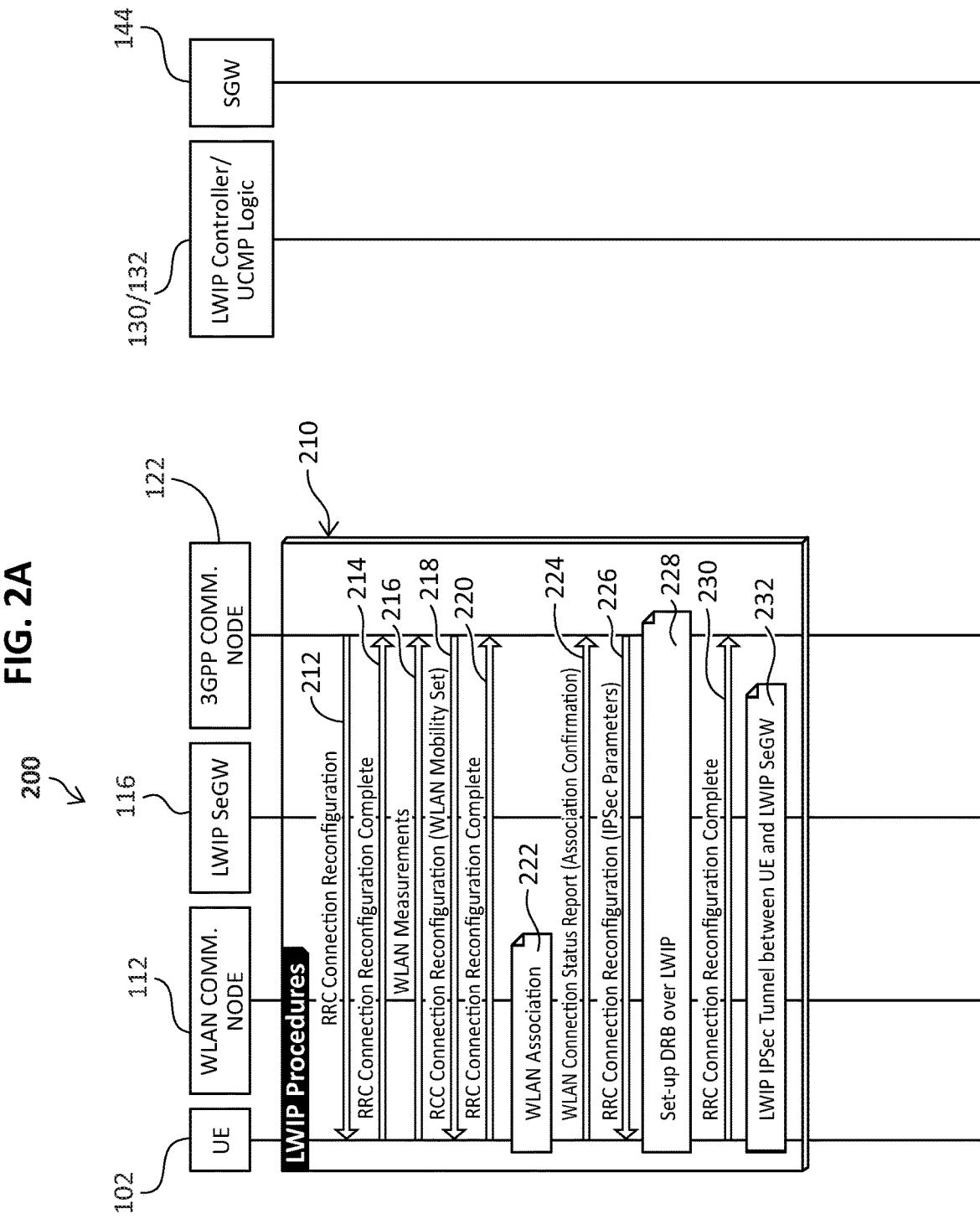

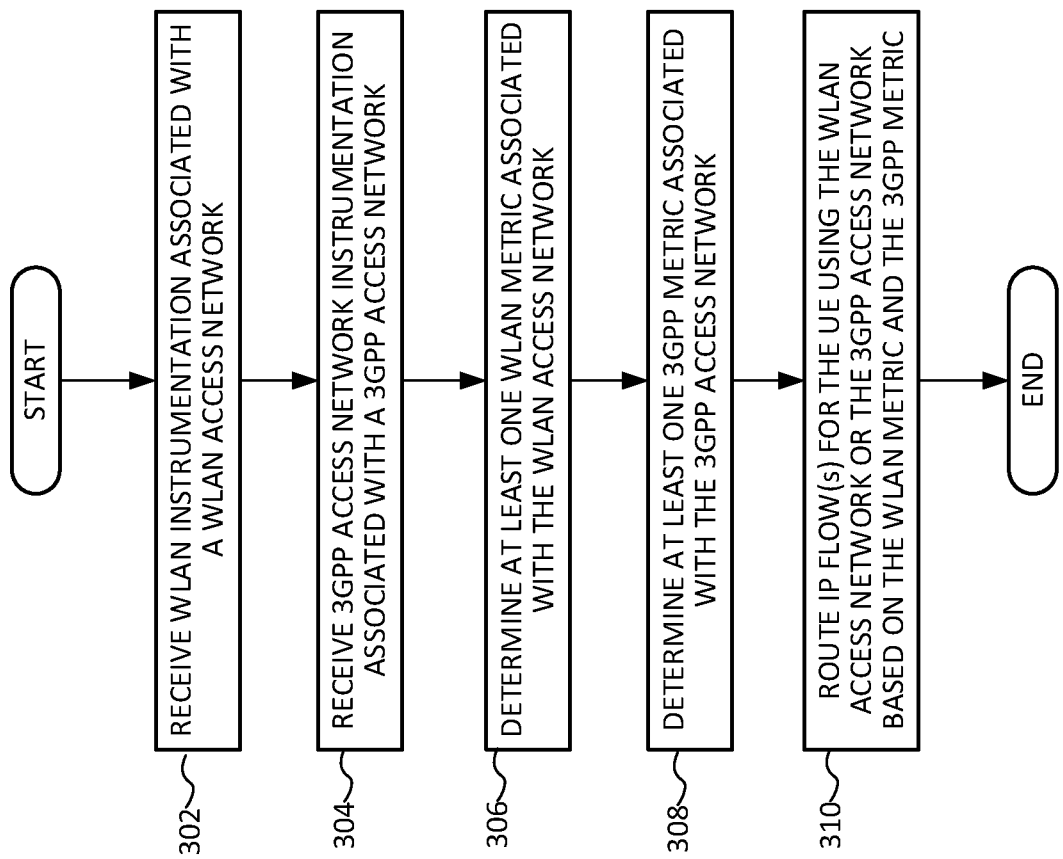

SYSTEM AND METHOD TO FACILITATE UNEQUAL COST MULTIPATH ROUTING IN A NETWORK ENVIRONMENT

TECHNICAL FIELD

This disclosure relates in general to the field of communications and, more particularly, to a system and method to facilitate unequal cost multipath (UCMP) routing in a network environment.

BACKGROUND

Networking architectures have grown increasingly complex in communications environments, particularly mobile wireless environments. For example, network providers have developed architectures in which a communication network can include both 3rd Generation Partnership Project networks, such as Long Term Evolution (LTE) networks, and wireless local area networks (WLANs), such as Wi-Fi, can each be accessed by user equipment (UE) having multi-mode communication capabilities. 3GPP Release 13 (Rel-13) Technical Specifications define several integrated LTE-WLAN interworking architectures including LTE-WLAN Aggregation (LWA), LTE WLAN Radio Level Integration with Internet Protocol Security (IPSec) Tunnel (LWIP), and Radio Access Network (RAN) Controlled LTE-WLAN Interworking (RCLWI). Currently, LWIP is defined as using a bearer switch to route IP flows between LTE and WLAN communication links, which causes LWIP interworking architectures to be at a disadvantage over LWA interworking architectures that provide for aggregating IP flows over both LTE and WLAN links. Accordingly, there are significant challenges in aggregating IP flows over LTE and WLAN links for LWIP interworking architectures.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2B are a simplified interaction diagram illustrating example details that can be associated with providing UCMP routing in an LWIP network environment in accordance with one example embodiment of the present disclosure;

FIG. 3 is a simplified flow diagram illustrating example operations that can be associated with providing UCMP routing in an LWIP network environment in accordance with one example embodiment of the present disclosure.

DETAILED DESCRIPTION OF EXAMPLE EMBODIMENTS

Overview

Figure 1:
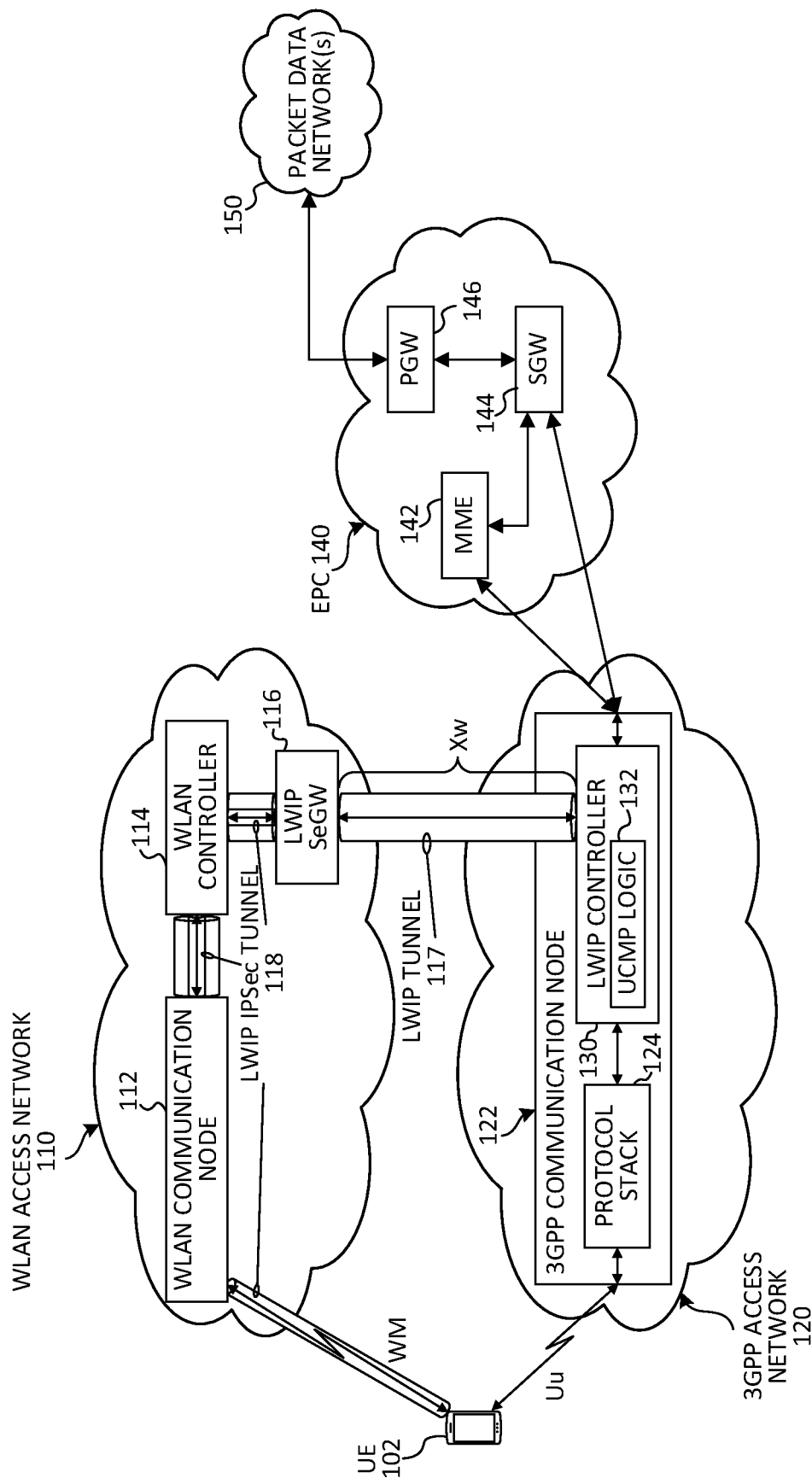
FIG. 1 is a simplified block diagram illustrating a communication system that can facilitate unequal cost multipath (UCMP) routing in a network environment according to one embodiment of the present disclosure.

A method is provided in one example embodiment and may include determining a first routing metric associated with a first communication network, wherein the first routing metric identifies a capability of the first communication network to handle an Internet Protocol (IP) flow for a user equipment (UE); determining a second routing metric associated with a second communication network, wherein the second routing metric identifies a capability of the second communication network to handle the IP flow for the UE and wherein the second routing metric is different from the first routing metric; and routing the IP flow for the UE using the first communication network or the second communication network based, at least in part, on the first routing metric and the second routing metric.

Determining the first routing metric can include at least one of: determining at least one of uplink throughput, uplink signal strength information, and uplink signal quality information for the UE for the first communication network; determining at least one of downlink throughput, downlink signal strength information, and downlink signal quality information for the UE for the first communication network; and determining a load associated with the first communication network. Determining the second routing metric can include at least one of: determining at least one of uplink throughput, uplink signal strength information, and uplink signal quality information for the UE for the second communication network; determining at least one of downlink throughput, downlink signal strength information, and downlink signal quality information for the UE for the second communication network; and determining at least one of a load and a channel utilization associated with the second communication network.

In some cases routing the IP flow for the UE can include: calculating a first normalized routing metric based on the first routing metric divided by a sum of the first routing metric and the second routing metric; calculating a second normalized routing metric based on the second routing metric divided by the sum of the first routing metric and the second routing metric; setting at least one threshold value based on the larger of the first normalized routing metric or the second normalized routing metric; and calculating a hash of an IP flow tuple value associated with the IP flow for the UE. In some cases, the routing can further include: selecting either the first communication network or the second communication network to receive the IP flow based on a comparison between the hash of the IP flow tuple value and the at least one threshold value; and routing the IP flow toward a Radio Frequency (RF) communication node of the first communication network or toward a RF communication node of the second communication network based on the selecting.

In some cases, the first communication network can be a 3rd Generation Partnership Project (3GPP) network and the second communication network can be a wireless local area network (WLAN) comprising an Internet Protocol (IP) Security Gateway. In some instances, the method can be performed by unequal cost multipath (UCMP) routing logic configured for a Radio Access Network (RAN), the RAN comprising a plurality of 3GPP Radio Frequency (RF) communication nodes and a plurality of WLAN RF communication nodes. In some instances, the UCMP routing logic can be configured for each of the plurality of 3GPP RF communication nodes. In other instances, the UCMP routing logic can be configured external to the plurality of 3GPP RF communication nodes.

Example Embodiments

Turning to FIG. 1, FIG. 1 is a simplified block diagram illustrating a communication system 100 to facilitate unequal cost multipath (UCMP) routing in a network environment according to one embodiment of the present disclosure. In one embodiment, the configuration illustrated in FIG. 1 may be tied to a Wireless Local Area Network (WLAN) and 3rd Generation Partnership Project (3GPP) architecture such as, for example, an Evolved-Universal Mobile Telecommunications System (UMTS) Terrestrial Radio Access Network (E-UTRAN). The E-UTRAN architecture, generally referred to as 4th Generation (4G)/Long Term Evolution (LTE) architecture, can interface with an Evolved Packet System (EPS) core, generally referred to as the Evolved Packet Core (EPC). Typically, E-UTRA is described in reference to the air-interface for LTE radio access. Alternatively, the depicted architecture can be applicable to other environments equally such as, for example, 5th Generation (5G) architectures and/or virtualized architectures such as, for example, a virtualized RAN (vRAN) architecture.

3GPP Technical Specifications, such as, for example, 3GPP Release 13 (Rel-13), define interworking between LTE access networks and WLAN access networks for different interworking architectures including LTE-WLAN Aggregation (LWA), LTE WLAN Radio Level Integration with Internet Protocol Security (IPSec) Tunnel (LWIP), and Radio Access Network (RAN) Controlled LTE-WLAN Interworking (RCLWI). In one embodiment, the configuration of communication system 100 can represent a LWIP interworking architecture.

As referred to herein in this Specification, the term 'plane' can refer to a separation of traffic that can traverse a network. Three planes can typically be found in communication networks including: a data-plane, a control-plane and a management-plane. The data-plane typically carries user traffic, while the control-plane typically carries signaling traffic used to provide routing information for user traffic and the management-plane, a subset of the control plane, typically carries administrative traffic. As referred to herein in this Specification, the terms 'user-plane', 'data-plane' and 'user data-plane' can be used interchangeably.

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment. In some embodiments, a Physical Network Function (PNF) may be referenced. A PNF is typically associated with a hardware radio head, which can be configured with one or more transmitters and receivers (and other associated hardware and/or software functionality) to facilitate over-the-air (OTA) Radio Frequency (RF) communications.

The example architecture of FIG. 1 for communication system 100 includes a user operating user equipment (UE) 102, a WLAN access network 110, a 3GPP access network 120, an Evolved Packet Core (EPC) 140 and one or more packet data network(s) 150. WLAN access network 110 can include a WLAN communication node 112, a WLAN controller 114 and a LWIP Security Gateway (SeGW) 116. 3GPP access network can include a 3GPP communication node 122, which can be configured with a protocol stack 124 and a LWIP controller 130. LWIP controller 130 can be configured with UCMP logic 132. EPC 140 can include a Mobility Management Entity (MME) 142, a serving gateway (SGW) 144 and a packet data network (PDN) gateway (PGW) 146.

UE 102 can interface with each respective WLAN communication node 112 and/or 3GPP communication node 122 simultaneously or separately via a respective OTA RF communication link with each respective node 112, 122. The communication link between UE 102 and 3GPP communication node 122 is typically referred to as a 'Uu' interface. The communication link between UE 102 and WLAN communication node 112 is typically referred to as a Wireless Medium (WM) interface. For 3GPP communication node 122, protocol stack 124 can interface with LWIP controller 130 including UCMP logic 132 and LWIP controller 130 can further interface with MME 142 and SGW 144 of EPC 140. Within EPC 140, MME 142 can further interface with SGW 144, which can further interface with PGW 146. PGW 146 can further interface with one or more packet data network(s) 150. For WLAN access network 110, WLAN communication node 112 can interface with WLAN controller 114, which can further interface with LWIP SeGW 116. LWIP SeGW 116 can further interface with LWIP controller 130 via an interface typically referred to as an 'Xw' interface.

Each of the elements of FIG. 1 may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions and/or operations of elements with each other, which can be directly or indirectly interconnected, in a network environment.

Additionally, any one or more of these elements may be combined or removed from the architecture based on particular configuration needs. Communications in a network environment are referred to herein as 'messages', 'messaging' and/or 'signaling', which may be inclusive of packets. Generally, signaling is referred to in reference to control-plane or management-plane packets while messaging can be referred to in reference to control-plane, management-plane or data-plane packets exchanged for communications at the application level.

A packet is a formatted unit of data and can contain both control information (e.g., source and destination address, etc.) and data, which is also known as payload. In some embodiments, control information can be included in one or more header(s) and/or one or more trailer(s) for each packet of an IP flow. Messages can be sent and received according to any suitable communication protocols. Suitable communication protocols can include a multi-layered scheme such as the Open Systems Interconnection (OSI) Model, or any derivations or variants thereof.

The terms 'data', 'information', 'parameters' and variations thereof as used herein can refer to any type of binary, numeric, voice, video, textual or script data or information or any type of source or object code, or any other suitable data or information in any appropriate format that can be communicated from one point to another in electronic devices and/or networks. Additionally, signaling, messages, requests, responses, replies, queries, etc. are forms of network traffic and, therefore, may comprise one or more packets.

A 'protocol layer' or a 'layer', as referred to herein, can be any layer in a multi-layered scheme that facilitates communications between layers, such as, for example, the OSI Model, using one or more communication protocols. A set of one or more interconnected layer(s) can be referred to herein as a 'protocol stack'. In some embodiments, a protocol stack may include only one layer.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network(s) (e.g., one or more packet data network(s) 150). Communication system 100 may offer communicative interfaces between various elements of communication system 100 and may be associated with any local area network (LAN), wireless local area network (WLAN), metropolitan area network (MAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

WLAN access network 110 may provide a WLAN-based (or, more generally, a non-3GPP-based) communications interface between UE 102 and EPC 140 via WLAN communication node 112, WLAN controller 114 and LWIP SeGW 116 that interfaces with LWIP controller 130 including UCMP logic 132. In various embodiments, WLAN access network 110 may include access networks such as an Institute of Electrical and Electronic Engineers (IEEE) 802.11 Wi-Fi access network and/or a WiGig access network, which can include a Hotspot 2.0 access networks, and/or a 802.16 Worldwide Interoperability for Microwave Access (WiMAX) access network.

In various embodiments, WLAN communication node 112 can be configured with one or more transmitter(s), receiver(s), processor(s), controller(s), memory element(s), storage, etc. to facilitate OTA RF communications (e.g., 802.11 Wi-Fi, Hotspot 2.0, etc.) between UE 102 and WLAN communication node 112. In some cases, a WLAN communication node 112 can be referred to as a WLAN access point (AP). In various embodiments, any WLAN communication node (e.g., WLAN communication node 112) deployed in communication system 100 can be configured as Wi-Fi AP, a Wi-Fi Hotspot 2.0 AP, WiMAX AP, combinations thereof or any other WLAN communication node as may be defined by IEEE standards, Wi-Fi Alliance® standards, IETF standards, combinations thereof or the like.

In various embodiments, WLAN controller 114 may be responsible for system wide wireless LAN functions, such as security policies, intrusion prevention, RF management, Quality of Service (QoS) functions, and/or mobility functions for WLAN access network 110 and one or more WLAN communication nodes. Although only one WLAN communication node 112 is illustrated in the example architecture shown in FIG. 1, it should be understood that WLAN access network can include multiple WLAN communication nodes.

Communications between UE 102 and the 3GPP access network via WLAN communication node 112 and WLAN controller 114 can be facilitated by a LWIP tunnel 117 as shown in FIG. 1. LWIP tunnel 117 can facilitate the establishment of a UE specific IP Security (IPSec) tunnel, shown in FIG. 1 as LWIP IPSec tunnel 118, to carry uplink (UL) and downlink (DL) IP flows between UE 102 and LWIP SeGW 116. As referred to herein in this Specification, an IP flow can refer to a sequence of packets that can be identified using either 5-tuple packet header information or 2-tuple packet header information for each packet of a flow. Header information can be referred to as header fields. A 5-tuple packet header identifies a source IP address, a destination IP address, a source port, a destination port and a transport protocol for a packet. A 2-tuple packet header identifies a source-IP address and a destination IP address for a packet.

During registration (e.g., power-on, initialization, re-initialization) of WLAN communication node 112 within WLAN access network 110, LWIP IPSec tunnel 118 can be established via LWIP SeGW 116 to protect communications between a given UE (e.g., UE 102) and LWIP SeGW 116. Generally, IPSec can use cryptographic security services to protect communications over IP networks. IPSec can support network-level peer authentication, data origin authentication, data integrity, data confidentiality (encryption), and replay protection. Implementation of IPSec can be based on Internet Engineering Task Force (IETF) standards.

3GPP access network 120 may provide a 3GPP-based communications interface between UE 102 and EPC 140. In various embodiments, 3GPP access network 120 may include access networks such as a Global System for Mobile Communications (GSM), General Packet Radio Services (GPRS), Enhanced Data Rates for GSM (EDGE) radio access network (GERAN), generally referred to as a 2nd Generation (2G) access network; a Universal Mobile Telecommunications System (UMTS) Terrestrial radio access network (UTRAN), High Speed Packet Access (HSPA/HSPA+), generally referred to as a 3rd Generation (3G) access network; and/or a E-UTRAN, which can include a 4G, LTE/LTE-Advanced (LTE-A)/LTE-Advanced Pro and/or 5G New Radio (NR) access network.

In various embodiments, 3GPP communication node 122 can be configured with one or more transmitter(s), receiver(s), processor(s), controller(s), memory element(s), storage, etc. to facilitate OTA RF communications (e.g., 4G, 5G, etc.) between UE 102 and 3GPP communication node 122. In various embodiments, protocol stack 124 can include a number of layers including, but not limited to, a Radio Resource Control (RRC) layer, a user data-plane GTP (GTP-U) layer, a Packet Data Convergence Protocol (PDCP) layer, a Radio Link Control (RLC) layer, a Medium Access Control (MAC) layer and/or a physical (PHY) layer. In various embodiments, any 3GPP communication node (e.g., 3GPP communication node 122) deployed in communication system 100 can be configured as an evolved Node B (eNodeB or eNB), a Home eNode B (HeNB), a Node B (NodeB), a Home NodeB (HNB), a Base Station System (BSS) combinations thereof or any other 3GPP communication node as may be defined by 3GPP standards.

In some embodiments, one or more protocol layers of 3GPP communication node 122 can be realized using protocol stack 124 and/or LWIP controller 130, which may or may not be configured as part of 3GPP communication node 122. For example, a vRAN deployment can facilitate a virtualized realization of functionality provided by protocol layers of protocol stack 124 and/or LWIP controller 130 using one or more VNFs/VNFCIs and/or PNFs. Generally, a virtualized realization can refer to a logical decomposition of 3GPP access network functionality across one or more sets or groups of VNFs/VNFCIs and/or PNFs.

For example, in one embodiment, a particular vRAN decomposition may be configured such that functionality for the PHY layer or part of the PHY layer of the protocol stack can be implemented using a PNF configured as the RF termination point for a 3GPP communication node. Functionality for other protocol layers of the 3GPP communication node such as the RRC layer, the GTP-U layer, the PDCP layer, the RLC layer and the MAC layer can be implemented using one or more sets of VNFs/VNFCIs, which can be instantiated via servers or, more generally, compute nodes that can provided via one or more physical or cloud-based data centers that may or may not be at geographically different locations from the PNF and/or one or more other protocol layers for the 3GPP communication node. Further, LWIP controller functionality, including UCMP logic functionality, can be implemented using one or more sets of VNFs/VNFCIs, which can also be instantiated via compute nodes that can be provided via one or more physical or cloud-based data centers that may or may not be at geographically different locations from each other, the protocol layers of the 3GPP communication node and/or the PNF for the 3GPP communication node. Thus, in some embodiments, functionality for LWIP controller 130 can be implemented separate from the PHY layer of 3GPP communication node 122.

LWIP controller 130 including UCMP logic 132 can be configured to provide routing of one or more UE IP flow(s) using WLAN access network 110 or 3GPP access network 120 based, at least in part, on various WLAN-based metrics associated with WLAN access network 110 and various LTE-based metrics associated with 3GPP access network 120. In particular, UCMP logic 132 can perform UCMP load balancing across the access networks to facilitate offloading and/or onboarding of one or more data radio bearer (DRB) of a given UE (e.g., UE 102) according to WLAN metrics for the WLAN access network 110 and E-UTRAN metrics for the 3GPP access network 120 such that one access network may be loaded more or less than the other access network.

As referred to herein, the terms '3GPP access network', 'E-UTRAN', 'LTE' or 'LTE access network' can be used interchangeably to refer to various metrics (e.g., LTE metrics or E-UTRAN metrics), links (e.g., LTE link or E-UTRAN link), features, etc. that can be defined or provided via 3GPP access network 120; however, this is not meant to limit the broad scope of the present disclosure. It should be understood that the term '3GPP access network' can refer to any access network architecture (e.g., 3G, 5G, etc.) that may be defined by 3GPP as discussed for various embodiments described herein.

A DRB or, more generally, a 'bearer', can refer to a path, channel, tunnel or the like through which communications can be exchanged between two endpoints for a particular service, session, application, etc. (e.g., for an IP flow). Typically, bearers are referred to in association to communications exchanged between a UE and one or more elements or nodes of an EPC (e.g., EPC 140) for LTE architectures.

As referred to herein in this Specification, the terms 'metric', 'routing metric' or 'cost metric' can refer to a Key Performance Indicator (KPI) that can be used to characterize the capability of a particular access network to handle IP flows for one or more UE. During operation in various embodiments as described herein, metrics for each access network can be utilized by UCMP logic 132 to provide UCMP load balancing between the access networks. In various embodiments, various metrics that can be associated with WLAN access network 110 and/or 3GPP access network 120 can include, but not be limited to: load, channel utilization, resource utilization, signal strength, signal quality, throughput, error rate, combinations and/or variations thereof or the like.

The metrics for each access network can vary over time such that routing of IP flows across each access network can be varied according to the metrics for each access network. UCMP can be contrasted with Equal Cost Multipath (ECMP) routing, which enables the modulus (k) of a hash of IP headers to be used to distribute flows between k equal cost paths between two endpoints. UCMP is a routing technique that provides for load balancing flows across a number of unequal cost paths between two endpoints (e.g., between a UE and an PDN) such that the load balancing is performed according to a different routing metric applicable to each path, where metrics are typically associated with some routing protocol.

As applied to communication system 100, UCMP logic 132 can facilitate load balancing of UE flow(s) across WLAN access network 110 and 3GPP access network 120 in a dynamic manner depending on the metrics associated with each access network. In one embodiment, UCMP logic 132 can perform modulo (MOD) hashing operations on the IP flow tuple (e.g., 5-tuple, 2-tuple, etc.) of each packet of an IP flow to ensure that all packets for a flow are handled by a same access technology; thus, avoiding out of sequence packet arrivals within one particular flow. A routing metric, which can be referred to herein using the label 'Metric-i' for each 'i-th' access network of an N number of access networks where $\{0 \leq i < N\}$ can be normalized using the equation (Metric-i)/($\Sigma$Metrics), where the value $\Sigma$Metrics is the sum all routing metrics for all available N access networks. The normalized routing metric can be multiplied by a Weighting Factor (WF) to calculate an effective normalized weight, which can indicate a given access network's capability to handle IP flows. A value for the WF can be selected to weight the distribution of IP flows in proportion to the normalized routing metrics in order to load balance IP flows across access networks having unequal routing costs. For example, for embodiments in which normalized routing metrics are calculated between 0 and 1, a WF of 100 can be selected to determine an effective normalized weight of each routing metric Metric-i for each i-th access network.

A hash value (HV) for each IP flow tuple of each packet of an IP flow can be calculated using an equation HV(IP flow tuple)=HASH(IP flow tuple) MOD WF, where HASH(IP flow tuple) represents the hash of an IP flow tuple according to a given hashing function, which can be configured for UCMP logic 132. In various embodiments, a hashing function can be any function that can be used to map input data to output data of a fixed size. In various embodiments, different hashing function types can be configured for UCMP logic 132 depending on the size (e.g., number of bits) of flow tuple fields and/or the number of flow tuple fields to be used for hashing operations under the constraint that a hash function type returns a same output hash value for same input values (e.g., is deterministic). A resultant hash value calculated for each IP flow tuple of each packet of a given IP flow can be compared against a threshold value or ranges of threshold values associated with normalized routing metrics for a number of access networks to select an access network to which to route packets for the IP flow.

In various embodiments, the IP flow tuple used for the hashing can use 5-tuple information, 2-tuple information or any other information that can be assumed to remain constant for each packet of an IP flow such that the hash of the IP flow tuple for each packet remains unchanged across all packets for the IP flow. Additional details related to UCMP load balancing for routing IP flows in accordance with various embodiments of communication system 100 are described below.

Before detailing further features of communication system 100, certain contextual information is provided to understand different features of LWA and LWIP interworking architectures. Such information is offered earnestly and for teaching purposes only and, therefore, should not be construed in a way to limit the broad applications and teachings of the present disclosure.

The 3GPP LWIP interworking architecture, as currently defined in 3GPP Specifications, uses a bearer switch to route flows between WLAN and LTE communication links (e.g., access networks). This puts such LWIP architecture at a disadvantage over LWA, which provides for the ability to aggregate flows over WLAN and LTE communication links. In particular, LWA interworking architectures use PDCP sequence numbers for packets traversing WLAN and LTE links to enable any re-ordering that may need to be performed before passing the packets to higher layers. Current 3GPP specifications for LWIP interworking architectures do not provide for sequence numbering and 3GPP has not defined any approach for link aggregation.

In accordance with at least one embodiment, communication system 100 is configured to overcome the aforementioned shortcomings of current 3GPP LWIP interworking architecture by facilitating UCMP routing to load balance UE IP flow(s) across WLAN access network 110 and 3GPP access network 120 according to routing metrics determined for each access network. Thus, communication system 100 can provide a Layer 3 (L3) based approach to link aggregation that can be applied to LWIP interworking architectures.

During operation in at least one embodiment, LWIP controller 130 via UCMP logic 132 can facilitate load balancing flows between WLAN access network 110 and 3GPP access network 120 according to metrics determined for each access network. Interface Xw between LWIP SeGW 116 and LWIP controller 130 can facilitate the exchange of data-plane and control-plane communications between WLAN access network 110 and 3GPP access network 120. Metrics for each access network can be determined based on various instrumentation communications with LWIP controller 130. As referred to herein, the term 'instrumentation' can refer to reports, measurements, calculations, combinations thereof or the like that can be used by LWIP controller to determine WLAN metrics for WLAN access network 110 and E-UTRAN metrics for 3GPP access network 120.

LWIP instrumentation, which can include WLAN instrumentation and E-UTRAN instrumentation, can be sent to LWIP controller 130 for the controller to determine one or more downlink (e.g., from WLAN to UE) and uplink (e.g., from UE to WLAN) metrics for WLAN access network 110 and one or more downlink and uplink metrics for 3GPP access network 120.

In various embodiments, WLAN instrumentation can include different types of instrumentation including: WLAN aggregate instrumentation that can be based on aggregate information, reports, calculations or the like associated with multiple communications using a particular WLAN communication node; WLAN individual instrumentation that can be based on individual information, reports, calculations or the like associated with an individual UE communication; and/or RRC WLAN instrumentation that can be based on information, reports, calculations or the like associated with a given UE (e.g., UE 102) that is communicated to LWIP controller 130 via the 3GPP access network 120. Per 3GPP specifications, the E-UTRAN is operable to trigger RRC measurements by a UE for the WLAN access network, including signal strength and channel quality information. In various embodiments, WLAN instrumentation information or parameters can include, but not be limited to: Basic Service Set (BSS) Load, Hotspot 2.0 (HS2.0) Wireless Area Network (WAN) metrics as defined by HS2.0 guidelines, channel utilization, WLAN signal strength information, WLAN signal quality information, uplink metrics calculated by a given UE, measured uplink UE throughput, BSS Identifier(s) (BSSID(s)), Service Set Identifier(s) (SSID(s)), Homogenous Extended SSID(s) (HESSID(s)), combinations thereof or the like.

Typically, a HS2.0 deployment is a type of WLAN communication network configured by a Hotspot operator and a Hotspot service provider where the operator deploys and operates the network and the service provider provides network services and operates the AAA infrastructure to authenticate subscribers. During operation for a HS2.0 network, a given UE (e.g., UE 102) can query an Access Network Query Protocol (ANQP) server using one or more Generic Advertisement Service (GAS) query frames and can receive one or more ANQP element(s) in response. The UE can recover information from the ANQP element(s) that can aid the UE in network selection (e.g., selecting a WLAN communication to which to attach), association and authentication with the HS2.0 network. In at least one embodiment as prescribed by HS2.0 guidelines, WAN metrics can include a WAN metrics Hotspot 2.0 ANQP element, which can include information about a WAN link that connects a WLAN communication node to the Internet such as, for example, Link status (e.g., Link up, Link down, Link in test state); WAN link symmetry, which indicates whether a link speed is the same in the uplink and downlink (e.g., symmetric or asymmetric); Downlink speed, which is nominal in kilobits per second (kbps); Uplink speed (nominal in kbps); Downlink load and/or Uplink load (e.g., BSS load); and/or Load Measurement Duration, which is the time interval over which a WAN interface device (e.g., a WLAN AP or edge router) averages its load measurement.

In various embodiments, WLAN signal strength information can include Received Signal Strength Indicator (RSSI), Received Channel Power Indicator (RCPI), combinations thereof or other similar signal strength information. In at least one embodiment, WLAN access network 110 can be configured to signal to LWIP controller 130 the signal strength experienced by a particular UE for the WLAN access network. In various embodiments, the signaling from WLAN access network 110 can be performed on a periodic basis, on an event-driven basis (e.g., re-association, movement, etc.), on a flow basis, combinations thereof or the like.

In various embodiments, E-UTRAN instrumentation information or parameters for 3GPP access network 120 can include UE-reported downlink Channel Quality Information (CQI), downlink signal strength measurement information, downlink signal quality information, uplink UE throughput, uplink UE signal strength, uplink metrics calculated by a given UE, and/or quality information, combinations thereof or the like. In at least one embodiment, E-UTRAN signal strength measurement information can include Reference Signal Received Power (RSRP) as measured and reported by a given UE. In at least one embodiment, E-UTRAN signal quality information can include Reference Signal Received Quality (RSRQ). As defined in 3GPP TS 36.214, RSRP is the linear average over the power contributions of resource elements for resource blocks (RBs) that carry cell-specific reference signals (CRS) within a considered measurement frequency bandwidth. RSRQ is defined as the ratio of the number (N) of RBs of the E-UTRA carrier RSSI measurement bandwidth (e.g., the system bandwidth) multiplied by the RSRP divided by the RSSI, generally expressed as '(N*RSRP)/RSSI'.

LWIP controller 130 can determine downlink metrics for each access network according to metric functions that operate on the instrumentation received for each access network. In various embodiments, different downlink metric functions can be configured for LWIP controller 130 that can be used to calculate downlink WLAN metrics and downlink E-UTRAN metrics for each access network based on received instrumentation. Downlink WLAN metric functions can be configured for LWIP controller 130 that can be used to derive a WLAN cost or routing metric for WLAN access network 110. For example, in at least one embodiment a downlink WLAN metric can be represented as: downlink WLAN metric=Function (WLAN aggregate instrumentation, WLAN individual instrumentation, RRC WLAN instrumentation).

Downlink E-UTRAN metric functions can also be configured for LWIP controller 130 that can be used to derive an E-UTRAN routing metric for 3GPP access network 120. For example, in at least one embodiment a downlink E-UTRAN metric can be represented as downlink E-UTRAN metric=Function (various E-UTRAN instrumentation [e.g., reported CQI, reported measurement values, etc.]).

Consider additional example details regarding WLAN metrics and E-UTRAN metrics that can be configured for LWIP controller 130 and UCMP logic 132 in accordance with various embodiments. To provide more details on the types of metrics that can be provided in various embodiments of communication system 100, it is useful to consider the type of metrics that 3GPP deployments often use to balance traffic across two LTE carriers in Carrier Aggregation (CA) mode (e.g., between a 700 megahertz (MHz) carrier and a 2 GHz carrier). Such metrics are defined in 3GPP TS 36.314, which provides details on eNodeB measurements regarding Physical Resource Block (PRB) utilization, Received Random Access Preambles, number of active UEs, packet delay, packet loss, scheduled IP throughput and data volume. Note that many of these metrics can be generalized, which can be valuable for making intelligent decisions regarding load balancing across LTE carriers in CA mode.

For instance, PRB usage can represent a percentage of the PRBs used on each carrier over a defined period of time. Regardless of whether a carrier is 5 MHz, 10 MHz or 20 MHz in BW, the PRB usage metric can provide a measure of the loading on a given carrier. Using such a metric, UCMP logic 132 can attempt to move IP flows from a high PRB usage carrier to a low PRB usage carrier.

Similarly, scheduled IP throughput metrics can represent measures of experienced user throughput on a given carrier. Wider bandwidth (BW) carriers will naturally support a higher load while maintaining a same user experienced throughput compared to lower BW carriers. So again, this metric could be used to move IP flows from carriers with lower experienced user throughput to a carrier with higher user experienced throughputs in accordance with various embodiments.

For the WLAN access network 110, equivalent WLAN metrics can be defined that parallel those provided in 3GPP TS 36.314. For instance, since Wi-Fi does not currently implement OFDMA, a channel occupancy metric could be defined as provided in Equation 1 (Eq. 1), below:

$$CO(T)=[(CO1(T)/S(T))*100] \qquad \text{Eq. 1}$$

For Eq. 1, 'CO(T)' can be equal to the percentage of time that a channel is occupied over a given period 'T'; 'CO1(T)' can be equal to the number of nine (9) microsecond (μs) slots where the channel was occupied over the period T; and 'S(T)' can be equal to the total number of 9 μs slots over the period T. In at least one embodiment, a WLAN metric as provided in Eq. 1 would be equivalent to PRB utilization for LTE and thus could be by UCMP logic 132 to provide for load balancing IP flows between 3GPP access network 120 and WLAN access network 110 for an LWIP session for a given UE.

Similarly, a downlink IP throughput metric for WLAN access network 110 could be defined as provided in Equation 2 (Eq. 2), below:

$$\frac{\Sigma ThpVolDl}{\Sigma ThpTimeDl} \times 1000 \left[\frac{kbits}{s}\right] \qquad \text{Eq. 2}$$

For Eq. 2, 'ThpTimeDl' (e.g., throughput time downlink) can represent a downlink Transmit Opportunity (TXOP) interval defined by times T1 and T2 such that ThpTimeDl=T1–T2 (in milliseconds (ms)) where T1 is a point in time after T2 when a TXOP data burst was transmitted, as acknowledged by a given client (e.g., UE) and T2 is point in time when a TXOP begins after a MAC Protocol Data Unit (MPDU) becomes available for transmission and 'ThpVolDl' (e.g., throughput volume downlink) is equal to a volume of a data burst, excluding any data transmitted a slot when the buffer emptied (e.g., so only full slots can be considered).

A given UE (e.g., UE 102) is responsible for calculating uplink metrics for each access network with which it is in communication. During operation, for example, UE 102 can determine an uplink WLAN metric for WLAN access network 110 and an uplink E-UTRAN metric for 3GPP access network 120 and can send the instrumentation for each access network (e.g., the uplink metrics for each access network) to LWIP controller 130.

In various embodiments, an uplink WLAN metric calculated by UE 102 can be based on HS2.0 recovered information, which can include BSS load and/or channel utilization, WLAN signal and quality information, and/or measured uplink WLAN throughput, combinations thereof or the like. In various embodiments, an uplink E-UTRAN metric calculated by UE 102 can be based on LTE signal strength and quality information, and/or measured LTE throughput, combinations thereof or the like.

Based on the various metrics determined for each access network, UCMP logic 132 can perform load balancing for an LWIP capable UE (e.g., UE 102) to load balance one or more IP flow(s) for the UE across WLAN access network 110 and 3GPP access network 120. Thus, communication system 100 can provide a system and method for using UCMP techniques for aggregating WLAN and LTE links in LWIP architectures. In at least one embodiment, the solution provided communication system 100 can provide for the ability to offer aggregated service for LWIP compared with 3GPP standards-based functionality but without the need for providing re-ordering of PDCP sequence numbers, as is defined for LWA architectures.

In various embodiments, UE 102 can be associated with any electronic device wishing to initiate a flow in communication system 100 via some network. In at least one embodiment, UE 102 can be configured to facilitate simultaneous WLAN connectivity and 3GPP connectivity within communication system 100. The terms 'UE', 'mobile device', 'end device', 'user', 'subscriber' or variations thereof can be used herein in this Specification interchangeably and are inclusive of devices used to initiate a communication, such as a computer, an electronic device such as an Internet of Things (IoT) device, etc., a personal digital assistant (PDA), a laptop or electronic notebook, a cellular telephone, an IP phone, an electronic device having cellular and/or Wi-Fi connection capabilities, a wearable electronic device or any other device, component, element, or object capable of initiating voice, audio, video, media, or data exchanges within communication system 100. UE 102 may also be inclusive of a suitable interface to a human user such as a microphone, a display, a keyboard, or other terminal equipment.

UE 102 may also be any device that seeks to initiate a communication on behalf of another entity or element such as a program, application, a database, or any other component, device, element, or object capable of initiating an exchange within communication system 100. Within communication system 100, IP addresses (e.g., for UE 102 or any other element in communication system 100) can be assigned using Dynamic Host Configuration Protocol (DHCP), Stateless Address Auto-configuration (SLAAC), during default bearer activation processes, or any suitable variation thereof. IP addresses used within communication system 100 can include IP version 4 (IPv4) and/or IP version 6 (IPv6) IP addresses.

In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, MME 142 can provide tracking area list management, idle mode UE tracking, bearer activation and deactivation, serving gateway and packet data network gateway selection for UEs and authentication services. In at least one embodiment, MME 142 may be in communication with a Home Subscriber Server (not shown), which may include one or more databases containing user-related and subscription-related information. An HSS may perform functionalities such as mobility management, call and session establishment support, user authentication and access authorization. In various embodiments, SGW 144 may route and forward user data packets (e.g., flows) and may also act as the mobility anchor for the user plane during inter-eNodeB handovers and as the anchor for mobility between LTE and other 3GPP technologies. In various embodiments, PGW 146 may provide IP connectivity access network (IP-CAN) session connectivity from a given UE (e.g., UE 102) to external packet data network(s) 150 by being the point of exit and entry of IP flows for the UE. In various embodiments, EPC 140 can include various additional elements and/or nodes as may be defined by 3GPP standards including, but not limited to: Authentication, Authorization and Accounting (AAA) elements, Policy and Charging Rules Functions (PCRFs), Mobile Switching Centers (MSCs), Serving GPRS Support Nodes (SGSNs), Gateway GPRS Support Nodes (GGSNs) to facilitate the exchange of data to and from one or more PDNs for one or more UEs. These network elements are also not shown in order to illustrate other features of communication system 100. In various embodiments, one or more PDN(s) 150 can include the Internet, an IP Multimedia Subsystem (IMS), an enterprise network, operator IP services, combinations thereof or the like.

Figure 2B:
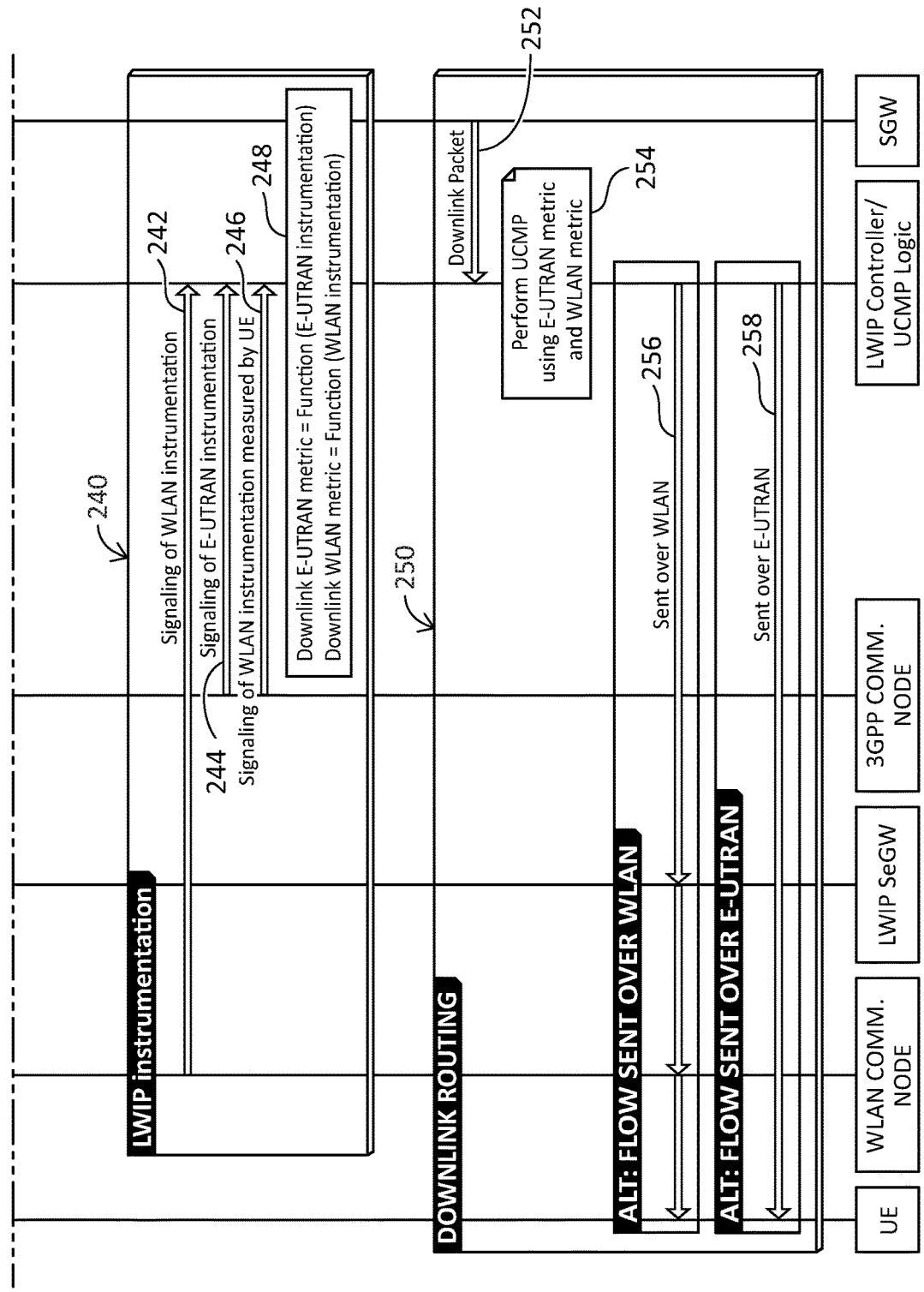

Turning to FIGS. 2A-2B, FIGS. 2A-2B are a simplified interaction diagram 200 illustrating example details that can be associated with providing UCMP routing in an LWIP network environment in accordance with one example embodiment of the present disclosure. The embodiment of FIGS. 2A-2B includes UE 102, WLAN communication node 112, LWIP SeGW 116, 3GPP communication node 122, LWIP controller 130 including UCMP logic 132 and SGW 144.

During operation, as shown in FIG. 2A, a set of operations (210) can be performed using LWIP procedures in order to associate UE 102 with WLAN access network 110 and establish an LWIP IPSec tunnel between UE 102 and LWIP SeGW 116. Operations 210 assume that UE 102 is attached to 3GPP communication node 122. At 212, 3GPP communication node 122 sends an RRC Connection Reconfiguration message to UE 102 requesting UE 102 to report WLAN measurements and information (e.g., signal strength, quality, SSID information, BSSID information, BSS load, etc.) for the WLAN access network. At 214, UE 102 responds with an RRC Connection Reconfiguration Complete message indicating that it has modified its RRC connection configuration. At 216, UE 102 sends its WLAN measurements to 3GPP communication node 122.

At 218, 3GPP communication node 122 sends UE 102 a RRC Connection Reconfiguration message indicating a WLAN mobility set (e.g., one or more WLAN identifiers such as BSSID, SSID and/or HESSID). At 220, UE 102 sends a RRC Connection Reconfiguration Complete message to 3GPP communication node 122 indicating receipt and storage of the WLAN mobility set. At 222, UE 102 performs a WLAN association with WLAN communication node 112. As prescribed by IEEE 802.11, association procedures carried out between a UE and a WLAN AP are used to establish an AP/UE mapping that enables UE invocation of system services. Association differs from authentication in that authentication generally refers to the process where an entity's identity is authenticated, typically by providing evidence that it holds a specific digital identity such as an identifier and corresponding credentials. Completion of UE association typically follows a successful authentication of the UE with a WLAN AP.

Upon completion of the WLAN association, UE 102 sends 3GPP communication node 122 a WLAN Connection Status Report message at 224 confirming association to WLAN access network 110. At 226, 3GPP communication node 122 via LWIP controller 130 sends UE 102 a RRC Connection Reconfiguration message including IPSec parameters that allow UE 102 to establish a DRB over LWIP with LWIP controller 130. As per 3GPP TS 36.331, the RRC Connection Reconfiguration message can include the following syntax as shown in TABLE 1, below, to provide for setting-up a DRB over LWIP:

TABLE 1

EXAMPLE RRC CONNECTION RECONFIGURATION MESSAGE SYNTAX

```
lwip-Configuration-R13 ::= CHOICE{
    release    NULL,
    setup      SEQUENCE{lwip-Config-r13 LWIP-Config-r13}
}
```

The LWIP-Config-13 message is used to setup (or release) a DRB over LWIP. In some embodiments, an additional parameter, 'DRB-toAdd', can be included in the RRC Connection Reconfiguration message that can be used to indicate if a LWIP DRB is to be used for uplink flows only, downlink flows only or for both uplink and downlink flows, or if E-UTRAN is to be used (e.g., no flows are to be sent over WLAN). Although in some cases a LWIP DRB may be established and the DRB-toAdd parameter may indicate that E-UTRAN is to be used for uplink and downlink flows, establishment of the LWIP DRB can facilitate using the LWIP DRB at a later time, if needed (e.g., another RRC Connection Reconfiguration message can be sent indicating to use the LWIP DRB for certain IP flows).

At 228, UE 102 and 3GPP communication node 122 perform a set-up of a DRB over LWIP. Upon setting up the LWIP DRB, UE 102 sends 3GPP communication node 122 a RRC Connection Reconfiguration Complete message at 230. As shown at 232, LWIP IPSec tunnel 118 is established between UE 102 and LWIP SeGW 116, which interfaces with LWIP controller 130. Continuing to FIG. 2B, instrumentation operations (240) can be used to signal WLAN instrumentation and E-UTRAN instrumentation to LWIP controller 130. At 242, WLAN communication node 112 can signal WLAN instrumentation to LWIP controller 130. At 244, 3GPP communication node 122 can signal E-UTRAN instrumentation to LWIP controller 130. At 246, 3GPP communication node 122 can signal WLAN instrumentation as measured by UE 102 (e.g., as received at 216) to LWIP controller 130. At 248, LWIP controller can calculate a downlink E-UTRAN metric according to an E-UTRAN downlink metric function that uses the received E-UTRAN instrumentation and can calculate a downlink WLAN metric according to a WLAN downlink metric function that uses the received WLAN instrumentation. Although only downlink instrumentation is illustrated in FIG. 2B, in various embodiments, uplink instrumentation can also be sent to LWIP controller 130 from UE 102 via WLAN communication node 112 and 3GPP communication node 122 in order for the LWIP controller 130 to calculate an uplink WLAN metric and an uplink E-UTRAN metric for each access network according to a metric function configured for each access network.

Downlink packet operations (250) are shown for the embodiment of FIGS. 2A-2B assuming that a downlink packet destined for UE 102 is received, as shown at 252 by LWIP controller 130. Upon receiving a downlink packet for UE 102, LWIP controller 130 via UCMP logic 132 can perform UCMP load balancing at 254 using the downlink E-UTRAN metric and the downlink WLAN metric calculated at 248 to select an access network to use for routing the packet to UE 102.

Consider one operational example in which a first routing metric for a first access network is calculated as 35 and a second routing metric for a second access network is calculated as 15. A first normalized routing metric for the first access network can be calculated as 35/50=0.7, which can be multiplied by a WF 100 to determine an effective normalized weight of 70 for routing IP flows to the first access network. A second normalized routing metric for the second access network can be calculated as 15/50=0.3, which can be multiplied by a WF 100 to determine an effective normalized weight of 30 for routing IP flows to the first access network. Thus, a proportionate number of IP flows can be routed to the first access network over the second access network according to a ratio of 70:30. For the present operational example involving two access networks, a threshold value can be set to a value based on the larger of the effective normalized weights of the access networks (e.g., 70) and the HV of each IP flow tuple (e.g., HV(IP flow tuple)=HASH(IP flow tuple) MOD WF) can be compared against the threshold value to determine whether to select the first or the second access network to receive an IP flow.

A first range for selecting the first access network to receive an IP flow can be mapped to a relationship such that when HV(IP flow tuple)≤70, packets for an IP flow can routed to the first access network. A second range for selecting the second access network to receive an IP flow can be mapped to a relationship such that when HV(IP flow tuple)>70, packets for an IP flow can be routed to the second access network. Thus, based on the hash value for a given IP flow tuple for a given IP flow, UCMP logic 132 can, in various embodiments, perform a comparison between the hash value for the given IP flow tuple and one or more threshold values or ranges of threshold values such that each packet of the IP flow can be routed to a same access network when multiple access networks having unequal costs are available to receive IP flows. For the present operational example, the first access network would receive a proportionate number of flows over the second access network according to a ratio of 70:30.

Consider another example involving three available access networks in which the first access network is determined to have a first effective normalized weight of 60, a second access network is determined to have a second effective normalized weight of 30 and a third access network is determined to have a third effective normalized weight of 10 where IP flows can be routed in a proportion of 60:30:10 across the access networks. In this example, a first example range for selecting the first access network to receive IP flows can be expressed as HV(IP flow tuple)≤60; a second range for selecting the second access network to receive IP flows can be expressed as 60<HV(IP flow tuple)≤90; and a third range for selecting the third access network to receive IP flows can be expressed as HV(IP flow tuple)>90, where the limits for each range can represent threshold values for selecting an appropriate access network to receive IP flows.

Referring again to FIG. 2B, if UCMP logic 132 selects WLAN access network 110 to handle the downlink IP flow for UE 102, the operations can continue to 256 at which LWIP controller 130 via UCMP logic 132 routes the IP flow (e.g., routes packets for the flow) to LWIP SeGW 116, which forwards the flow to WLAN communication node 112, which forwards the flow to UE 102. However, if UCMP logic 132 selects 3GPP access network 120 to handle the downlink IP flow for UE 102, the operations can continue to 258 at which LWIP controller 130 via UCMP logic 132 routes the flow to UE 102. Thus, as shown in the embodiment of FIGS. 2A-2B, communication system 100 can facilitate the aggregation of IP flows over WLAN and E-UTRAN links using UCMP load balancing.

Referring to FIG. 3, FIG. 3 is a simplified flow diagram illustrating example operations 300 that can be associated with providing UCMP routing in an LWIP network environment in accordance with one example embodiment of the present disclosure. In at least one embodiment, the operations can begin at 302 at which LWIP controller 130 receives WLAN instrumentation for a WLAN access network (e.g., WLAN access network 110) for a given UE (e.g., for UE 102). At 304, the operations can include LWIP controller 130 receiving 3GPP access network instrumentation for a 3GPP access network (e.g., 3GPP access network 120) for the given UE.

At 306, the operations can include LWIP controller 130 determining at least one WLAN routing metric associated with the WLAN access network. In at least one embodiment, the LWIP controller 130 can determine at least one uplink WLAN metric and at least one downlink WLAN metric associated with the WLAN access network. At 308, the operations can include LWIP controller 130 determining at least one 3GPP routing metric associated with the 3GPP access network. In at least one embodiment, the LWIP controller 130 can determine at least one uplink 3GPP access network metric and at least one downlink 3GPP access network metric associated with the 3GPP metric.

At 310, the operations can include LWIP controller 130 via UCMP logic 132 routing one or more IP flows for the UE using the WLAN access network or the 3GPP access network based on the WLAN routing metric and the 3GPP routing metric and the operations can end. In various embodiments, a hash value of a given IP flow tuple (e.g., 5-tuple, 2-tuple, etc.) for each packet of an IP flow for the UE can be calculated and compared against one or more threshold values or ranges of threshold values associated with the effective normalized weight of each of a number of access network routing metrics such that each packet of the IP flow can be routed to a same access network thereby providing UCMP load balancing across the access networks.

Referring to FIGS. 4-7, FIGS. 4-7 are simplified block diagrams illustrating example details that can be associated with various example embodiments of communication system 100. In particular, FIGS. 4-7 illustrate various examples associated with implementing an LWIP controller and UCMP logic in various potential embodiments of communication system 100.

Figure 4:
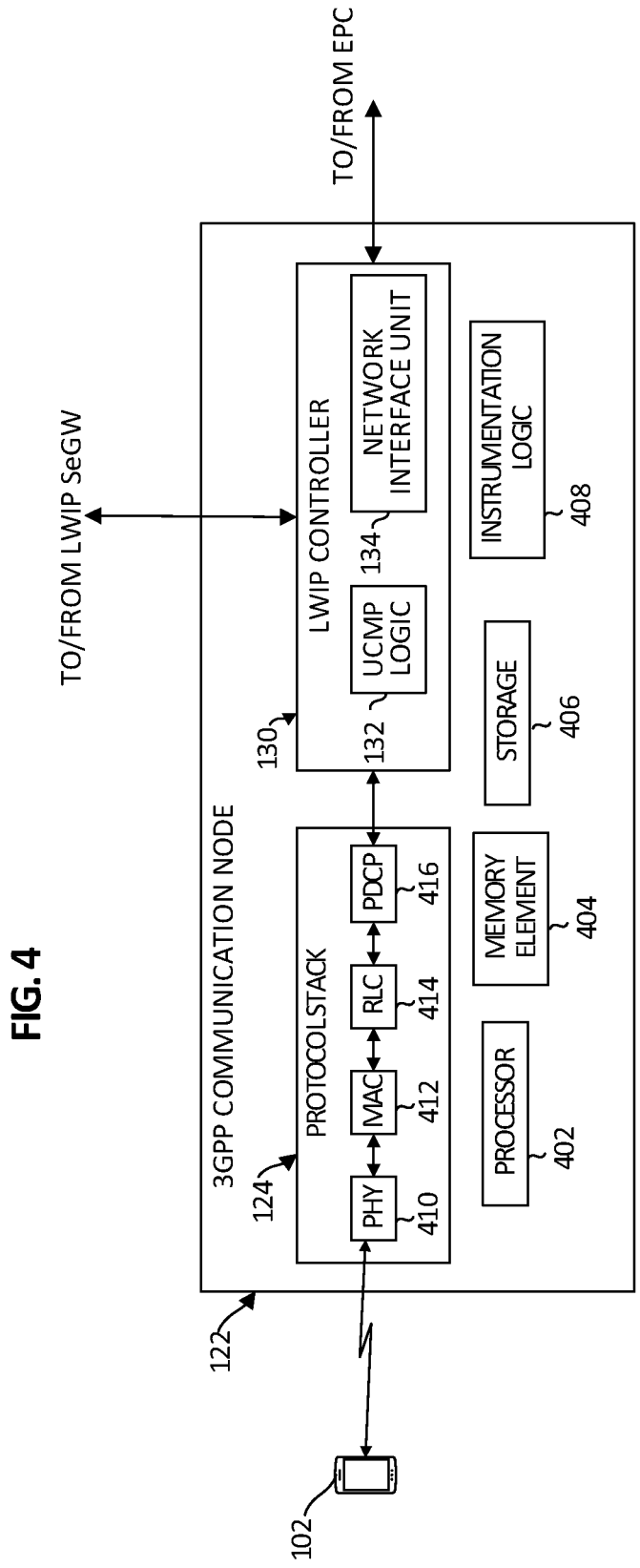
FIGS. 4-7 are simplified block diagrams illustrating example details that can be associated with various example embodiments of the communication system.

Referring to FIG. 4, FIG. 4 is a simplified block diagram illustrating example details that can be associated with 3GPP communication node 122 in accordance with one potential embodiment of communication system 100. As shown in the embodiment of FIG. 4, 3GPP communication node 122 can include protocol stack 124, LWIP controller 130, at least one processor 402, at least one memory element 404, at least one storage 406 and instrumentation logic 408. LWIP controller 130 can include UCMP logic 132 and a network interface unit 134. Protocol stack 124 can include a PDCP layer 416, an RLC layer 414, a MAC layer 412 and a PHY layer 410. PDCP layer can interface with LWIP controller 130 and RLC layer 414. RLC layer can further interface with MAC layer 412 and MAC layer can further interface with PHY layer 410. PHY layer 410 can further interface with UE 102, also shown in FIG. 4. UE 102 is also shown in the embodiment of FIG. 4.

In at least one embodiment, at least one processor 402 is at least one hardware processor configured to execute various tasks, operations and/or functions of 3GPP communication node 122 as described herein. At least one memory element 404 and/or storage 406 can be configured to store data, information, software and/or instructions associated with the 3GPP communication node 122. For example, in various embodiments, at least one memory element 404 and/or storage 406 can be configured to store one or more of: WLAN instrumentation; 3GPP (e.g., E-UTRAN) instrumentation; any instrumentation associated with an access network and/or user equipment; metric functions, metrics and/or calculations; interface information (e.g., tunnel information, IP address information, UE identifying information, etc.); logic; any other data, information, software and/or instructions as discussed for various embodiments described herein (e.g., UCMP logic 132 and/or instrumentation logic 408 can, in some embodiments, be stored in at least one memory element 404 and/or storage 406); combinations thereof or the like.

In various embodiments, instrumentation logic 408 can include instructions that, when executed (e.g., by at least one processor 402) cause 3GPP communication node 122 to signal of 3GPP (e.g., E-UTRAN) instrumentation to LWIP controller 130. In various embodiments, UCMP logic 132 can include instructions that, when executed (e.g., by at least one processor 402), cause LWIP controller 130 to perform one or more operations including, but not limited to: receiving instrumentation from various access networks (e.g., WLAN access network 110 and 3GPP access network 120); calculating various metrics for the access networks according to various metric functions; calculating normalized routing metrics; calculating effective normalized weights for access networks; hashing IP flow tuples; and load balancing UE IP flow(s) across networks according to the various metrics calculated and/or received from one or more UE. In at least one embodiment, UCMP logic 132 can include instructions that, when executed, cause LWIP controller 130 to access a 3GPP Operations, Administration and Management (OAM) system (not shown) to obtain E-UTRAN instrumentation and/or metrics for a 3GPP access network.

In various embodiments, network interface unit 134 enables communication between LWIP controller 130, a 3GPP communication node protocol stack (e.g., protocol stack 124), an LWIP SeGW (e.g., LWIP SeGW 116) and one or more elements of an EPC (e.g., MME 142 and SGW 144 of EPC 140) and/or any other elements that may be configured for communication system 100. In some embodiments, network interface unit 134 can be configured with one or more Ethernet driver(s), Fibre Channel driver(s), controller(s), etc. or other similar network interface driver(s) and/or controller(s) to enable communications for LWIP controller 130 within communication system 100.

In various embodiments, packetized DRBs for an IP flow can be received in a downlink data scenario by PDCP layer 415, which can operate on the flow as PDCP Service Data Units (SDUs) and can generate PDCP Protocol Data Units (PDU) to output to RLC layer 414. In one embodiment, PDCP layer 415 can apply encryption and/or other addressing and/or control information to the packets based on control signaling received from a Radio Resource Control (RRC) layer (not shown) configured for protocol stack 124. RLC layer 414 can operate on PDCP PDUs as RLC SDUs and can generate RLC PDUs to output to MAC layer 412. In one embodiment, RLC layer 414 can concatenate and segment higher layer PDCP PDUs into pre-derived packetized data blocks that can be passed to MAC layer 412. MAC layer 412 can operate on the RLC PDUs as MAC SDUs and can generate MAC PDUs (MPDUs) to send to PHY layer 410 containing data and/or control information or, more generally, resources allocated to a given UE (e.g., UE 102) across time and frequency domains. In various embodiments, MAC layer 412 can perform scheduling operations for scheduling transmissions, managing hybrid automatic repeat-request (HARQ) operations, combinations thereof or the like. In various embodiments, PHY layer 410 can interface with and/or include one or more receiver(s), transmitter(s) and antenna(s) (not shown) to enable OTA communications with one or more UE. In various embodiments, PHY layer 410 can perform one or more operations including, but not limited to: Forward Error Correction (FEC), Modulation (e.g., QAM, 16-QAM, 64-QAM, etc.), antenna mapping operations for Multiple Input Multiple Output (MIMO) functions, Inverse Fast Fourier Transform (IFFT), cyclic prefix (CP) functions, and/or parallel/serial (P/S) Common Public Radio Interface (CPRI) encoding for full CPRI or compressed CPRI functions, combinations thereof or the like.

Figure 5:
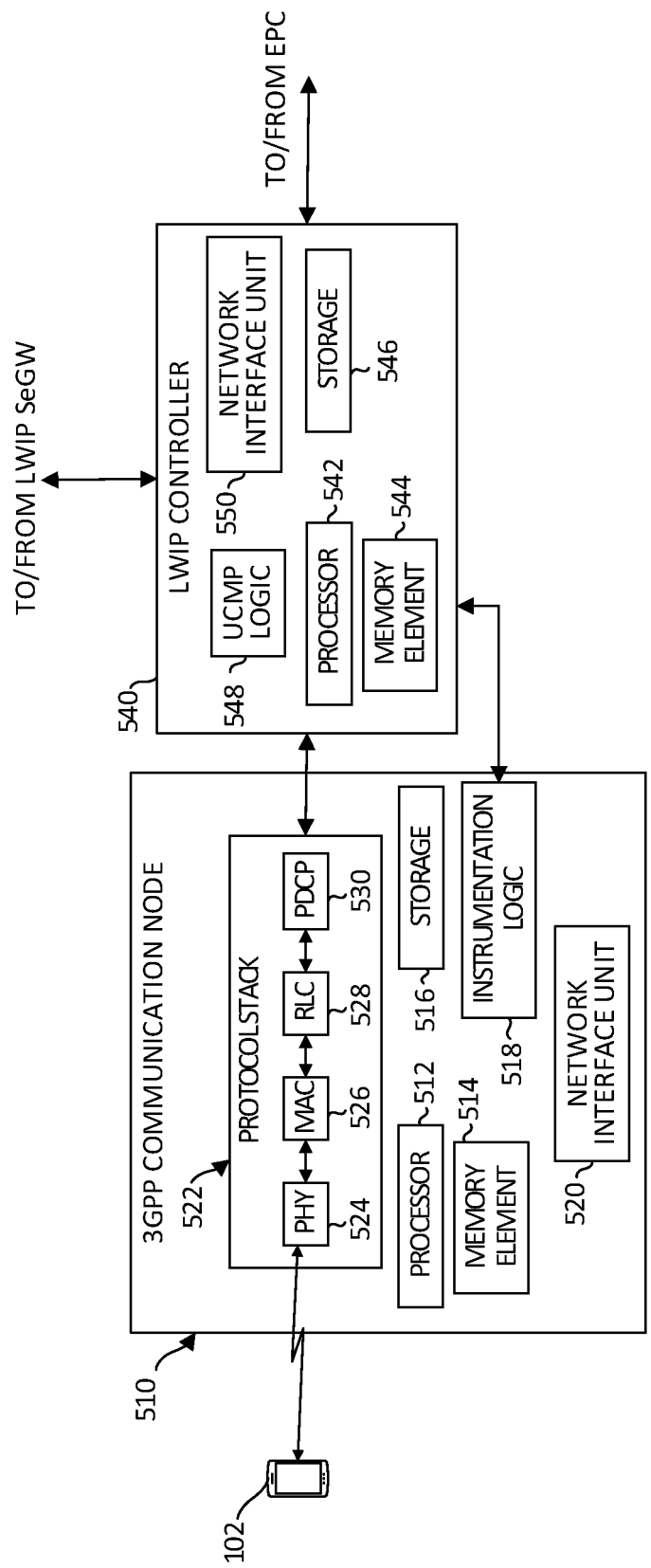

Referring to FIG. 5, FIG. 5 is a simplified block diagram illustrating example details that can be associated with a split configuration of a 3GPP communication node 510 and an LWIP controller 540 in accordance with one potential embodiment of communication system 100. For the embodiment of FIG. 5, 3GPP communication node 510 can be any 3GPP communication node that may be deployed in a 3GPP access network (e.g., 3GPP access network 120) that may be configured to signal 3GPP (e.g., E-UTRAN) instrumentation to a LWIP controller (e.g., LWIP controller 540). Further for the embodiment of FIG. 5, LWIP controller 540 can be a network element that can be configured separate from 3GPP communication node 510. UE 102 is also shown in the embodiment of FIG. 5.

As shown in the embodiment of FIG. 5, 3GPP communication node 510 can include at least one processor 512, at least one memory element 514, at least one storage 516, instrumentation logic 518, a network interface unit 520 and a protocol stack 522. Protocol stack 522 can include a PHY layer 524, a MAC layer 526, an RLC layer 528 and a PDCP layer 530, each of which can perform operations as discussed for various embodiments described herein. LWIP controller 540 can include at least one processor 542, at least one memory element 544, at least one storage 546, UCMP logic 548 and a network interface unit 550.

In at least one embodiment, at least one processor 512 is at least one hardware processor configured to execute various tasks, operations and/or functions of 3GPP communication node 510. At least one memory element 514 and/or storage 516 can be configured to store data, information, software and/or instructions associated with the 3GPP communication node 510. For example, in various embodiments, at least one memory element 514 and/or storage 516 can be configured to store one or more of: 3GPP (e.g., E-UTRAN) instrumentation collected, received, determined and/or calculated by 3GPP communication node 510; any other instrumentation associated with a 3GPP access network and/or received from user equipment; interface information (e.g., tunnel information, IP address information, UE identifying information, etc.); logic; any other data, information, software and/or instructions as discussed for various embodiments described herein (e.g., instrumentation logic 518 can, in some embodiments, be stored in at least one memory element 514 and/or storage 516); combinations thereof or the like.

In various embodiments, instrumentation logic 518 can include instructions that, when executed (e.g., by at least one processor 512) cause 3GPP communication node 510 to signal of 3GPP (e.g., E-UTRAN) instrumentation to LWIP controller 540. In various embodiments, network interface unit 520 enables communication between a 3GPP communication node 510 and LWIP controller 540 and/or any other elements that may be configured for communication system 100 (e.g., other 3GPP communication nodes via an X2 interface). In some embodiments, network interface unit 520 can be configured with one or more Ethernet driver(s), Fibre Channel driver(s), controller(s), etc. or other similar network interface driver(s) and/or controller(s) to enable communications for 3GPP communication node 510.

In at least one embodiment, at least one processor 542 of LWIP controller 540 is at least one hardware processor configured to execute various tasks, operations and/or functions of LWIP controller 540. At least one memory element 544 and/or storage 546 can be configured to store data, information, software and/or instructions associated with the LWIP controller 540. For example, in various embodiments, at least one memory element 544 and/or storage 546 can be configured to store one or more of: WLAN instrumentation; 3GPP (e.g., E-UTRAN) instrumentation; any other instrumentation associated with an access network and/or received from user equipment; metric functions, information and/or calculations; interface information (e.g., tunnel information, IP address information, UE identifying information, etc.); logic; any other data, information, software and/or instructions as discussed for various embodiments described herein (e.g., UCMP logic 548 can, in some embodiments, be stored in at least one memory element 544 and/or storage 546); combinations thereof or the like.

In various embodiments, UCMP logic 548 can include instructions that, when executed (e.g., by at least one processor 542), cause LWIP controller 540 to perform one or more operations including, but not limited to: receiving instrumentation from various access networks (e.g., WLAN access network 110 and 3GPP access network 120); calculating various metrics for the access networks according to various metric functions; calculating normalized routing metrics; calculating effective normalized weights for access networks; hashing IP flow tuples; and load balancing UE IP flow(s) across access networks according to the various metrics calculated and/or received from one or more UE. In at least one embodiment, UCMP logic 548 can include instructions that, when executed, cause LWIP controller 130 to access a 3GPP Operations, Administration and Management (OAM) system (not shown) to obtain E-UTRAN instrumentation and/or metrics for a 3GPP access network.

Figure 6:
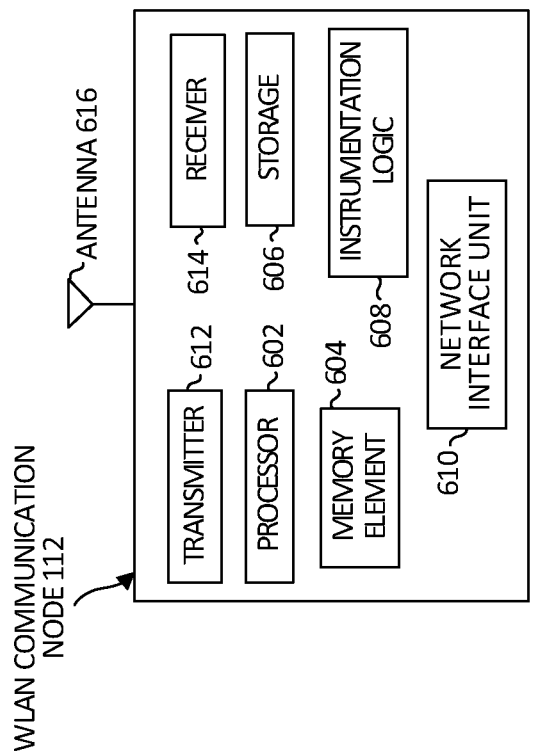

Referring to FIG. 6, FIG. 6 is a simplified block diagram illustrating example details that can be associated with WLAN communication node 112 in accordance with one potential embodiment of communication system 100. As illustrated in the embodiment of FIG. 6, WLAN communication node 112 can include at least one processor 602, at least one memory element 604, at least one storage 606, instrumentation logic 608, a network interface unit 610, at least one transmitter 612, at least one receiver 614 and at least one antenna 616. In various embodiments, at least one transmitter 612, at least one receiver 614 and at least one antenna 616 can be configured to enable OTA communications with one or more UE (e.g., UE 102).

In at least one embodiment, at least one processor 602 is at least one hardware processor configured to execute various tasks, operations and/or functions of WLAN communication node 112. At least one memory element 604 and/or storage 606 can be configured to store data, information, software and/or instructions associated with the WLAN communication node 112. For example, in various embodiments, at least one memory element 604 and/or storage 606 can be configured to store one or more of: WLAN individual instrumentation collected, received, determined and/or calculated by WLAN communication node 112 for a particular UE communication; WLAN aggregate instrumentation collected, received, determined and/or calculated by WLAN communication node for multiple communications; any other instrumentation associated with a WLAN access network and/or received from user equipment; interface information (e.g., tunnel information, IP address information, UE identifying information, etc.); logic; any other data, information, software and/or instructions as discussed for various embodiments described herein (e.g., instrumentation logic 608 can, in some embodiments, be stored in at least one memory element 604 and/or storage 606); combinations thereof or the like.

In various embodiments, instrumentation logic 608 can include instructions that, when executed (e.g., by at least one processor 602) cause WLAN communication node 112 to signal of WLAN individual instrumentation to a LWIP controller (e.g., LWIP controller 130 of FIG. 1 or LWIP controller 540 of FIG. 5) via a corresponding WLAN controller (e.g., WLAN controller 114) and LWIP SeGW (e.g., LWIP SeGW 116). In various embodiments, network interface unit 610 enables communication between WLAN communication node 112, a WLAN controller, a LWIP SeGW, an LWIP controller and/or any other elements that may be configured for communication system 100. In some embodiments, network interface unit 610 can be configured with one or more Ethernet driver(s), Fibre Channel driver(s), controller(s), etc. or other similar network interface driver(s) and/or controller(s) to enable communications for WLAN communication node 112.

Figure 7:
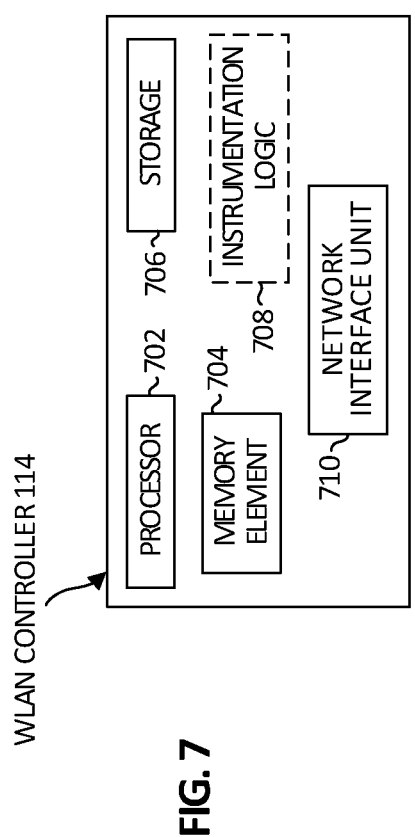

Referring to FIG. 7, FIG. 7 is a simplified block diagram illustrating example details that can be associated with WLAN controller 114 in accordance with one potential embodiment of communication system 100. As illustrated in the embodiment of FIG. 7, WLAN controller 114 can include at least one processor 702, at least one memory element 704, at least one storage 706, and a network interface unit 710. In at least one embodiment, WLAN controller 114 can include instrumentation logic 708.

In at least one embodiment, at least one processor 702 is at least one hardware processor configured to execute various tasks, operations and/or functions of WLAN controller 114. At least one memory element 704 and/or storage 706 can be configured to store data, information, software and/or instructions associated with the WLAN controller 114. For example, in various embodiments, at least one memory element 704 and/or storage 706 can be configured to store one or more of: any instrumentation associated with a WLAN access network and/or received from user equipment; interface information (e.g., tunnel information, IP address information, UE identifying information, etc.); logic; any other data, information, software and/or instructions as discussed for various embodiments described herein (e.g., instrumentation logic 708 can, in some embodiments, be stored in at least one memory element 704 and/or storage 706); combinations thereof or the like.

In various embodiments, instrumentation logic 708 can include instructions that, when executed (e.g., by at least one processor 702) cause WLAN controller 114 to signal of WLAN instrumentation to a LWIP controller (e.g., LWIP controller 130 of FIG. 1 or LWIP controller 540 of FIG. 5) via a corresponding LWIP SeGW (e.g., LWIP SeGW 116) for WLAN instrumentation and/or metrics collected from one or more WLAN communication nodes and/or from a RAN Management System or the like. In various embodiments, network interface unit 710 enables communication between WLAN controller 114, an LWIP SeGW, an LWIP controller and/or any other elements that may be configured for communication system 100. In some embodiments, network interface unit 780 can be configured with one or more Ethernet driver(s), Fibre Channel driver(s), controller(s), etc. or other similar network interface driver(s) and/or controller(s) to enable communications for WLAN controller 114.

In regards to the internal structure associated with communication system 100, each of respective UE 102, LWIP SeGW 116, MME 142, SGW 144, and PGW 146 can also include a respective at least one processor, a respective at least one memory element, a respective at least one storage, a respective network interface unit, respective logic, combinations thereof or the like to facilitate UCMP routing in an LWIP network environment. Hence, appropriate software, hardware and/or algorithms are being provisioned for communication system 100 in order to facilitate operations as described for various embodiments discussed herein to facilitate UCMP routing in an LWIP network environment.

In various example implementations, UE 102, WLAN communication node 112, WLAN controller 114, LWIP SeGW 116, 3GPP communication node 122 (as shown in FIGS. 1 and 4) and 510 (as shown in FIG. 5), LWIP controller 130 (as shown in FIGS. 1 and 4) and 540 (as shown in FIG. 5), MME 142, SGW 144 and/or PGW 146 discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various operations as described for various embodiments discussed herein in a network environment (e.g., for networks such as those illustrated in FIG. 1). In various embodiments, one or more of UE 102, WLAN communication node 112, WLAN controller 114, LWIP SeGW 116, 3GPP communication node 122 (as shown in FIGS. 1 and 4) and 510 (as shown in FIG. 5), LWIP controller 130 (as shown in FIGS. 1 and 4) and 540 (as shown in FIG. 5), MME 142, SGW 144 and/or PGW 146 discussed herein can include software (or reciprocating software) that can coordinate in order to achieve operations associated with providing UCMP routing in an LWIP network environment as discussed herein and may include any suitable algorithms, hardware, software, components, modules, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, UE 102, WLAN communication node 112, WLAN controller 114, LWIP SeGW 116, 3GPP communication node 122 (as shown in FIGS. 1 and 4) and 510 (as shown in FIG. 5), LWIP controller 130 (as shown in FIGS. 1 and 4) and 540 (as shown in FIG. 5), MME 142, SGW 144 and/or PGW 146 discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to UE 102, WLAN communication node 112, WLAN controller 114, LWIP SeGW 116, 3GPP communication node 122 (as shown in FIGS. 1 and 4) and 510 (as shown in FIG. 5), LWIP controller 130 (as shown in FIGS. 1 and 4) and 540 (as shown in FIG. 5), MME 142, SGW 144 and/or PGW 146 discussed herein could be provided in any database, register, control list, cache, storage and/or storage structure: all of which can be referenced at any suitable timeframe. Any such storage options may also be included within the broad term 'memory element' as used herein. Any of potential processing elements, controllers, managers, logic and/or machines described herein can be construed as being encompassed within the broad term 'processor'. In various embodiments, each of UE 102, WLAN communication node 112, WLAN controller 114, LWIP SeGW 116, 3GPP communication node 122 (as shown in FIGS. 1 and 4) and 510 (as shown in FIG. 5), LWIP controller 130 (as shown in FIGS. 1 and 4) and 540 (as shown in FIG. 5), MME 142, SGW 144 and/or PGW 146 discussed herein can also include suitable interfaces for receiving, transmitting, and/or otherwise communicating data or information in a network environment.

Note that in certain example implementations, operations as outlined herein to facilitate UCMP routing in an LWIP network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 4-7] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 4-7] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, compute node, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   upon establishing a long term evolution wireless local area networks radio level integration with internet protocol security tunnel (LWIP) between a first communication network and a second communication network, receiving, at a LWIP controller at the first communication network, a first instrumentation for a user equipment (UE) for the first communication network;
   receiving, at the LWIP controller and from the second communication network via the LWIP, a second instrumentation for the UE for the second communication network;
   determining, using the LWIP controller and the first instrumentation, a first routing metric associated with the first communication network, wherein the first routing metric identifies a capability of the first communication network to handle an Internet Protocol (IP) flow for the UE;
   determining, using the LWIP controller and the second instrumentation, a second routing metric associated with the second communication network, wherein the second routing metric identifies a capability of the second communication network to handle the IP flow for the UE and wherein the second routing metric is different from the first routing metric; and
   providing network layer load balancing routing for the IP flow by routing, at the LWIP controller, the IP flow for the UE using the first communication network or the second communication network based, at least in part, on the first routing metric and the second routing metric.

2. The method of claim 1, wherein determining the first routing metric further comprises at least one of:
   determining at least one of uplink throughput, uplink signal strength information, and uplink signal quality information for the UE for the first communication network;
   determining at least one of downlink throughput, downlink signal strength information, and downlink signal quality information for the UE for the first communication network; and
   determining a load associated with the first communication network.

3. The method of claim 1, wherein determining the second routing metric further comprises at least one of:
   determining at least one of uplink throughput, uplink signal strength information, and uplink signal quality information for the UE for the second communication network;
   determining at least one of downlink throughput, downlink signal strength information, and downlink signal quality information for the UE for the second communication network; and
   determining at least one of a load and a channel utilization associated with the second communication network.

4. The method of claim 1, wherein routing the IP flow for the UE further comprises:
   calculating a first normalized routing metric based on the first routing metric divided by a sum of the first routing metric and the second routing metric;
   calculating a second normalized routing metric based on the second routing metric divided by the sum of the first routing metric and the second routing metric;
   setting at least one threshold value based on a larger of the first normalized routing metric or the second normalized routing metric; and
   calculating a hash of an IP flow tuple value associated with the IP flow for the UE.

5. The method of claim 4, further comprising:
   selecting either the first communication network or the second communication network to receive the IP flow based on a comparison between the hash of the IP flow tuple value and the at least one threshold value; and
   routing the IP flow toward a Radio Frequency (RF) communication node of the first communication network or toward a RF communication node of the second communication network based on the selecting.

6. The method of claim 1, wherein the first communication network is a $3^{rd}$ Generation Partnership Project (3GPP) network and the second communication network is a wireless local area network (WLAN) comprising an Internet Protocol (IP) Security Gateway.

7. The method of claim 6, wherein routing the IP flow is performed by unequal cost multipath (UCMP) routing logic configured for a Radio Access Network (RAN), the RAN comprising a plurality of 3GPP Radio Frequency (RF) communication nodes and a plurality of WLAN RF communication nodes.

8. The method of claim 7, wherein the UCMP routing logic is configured for each of the plurality of 3GPP RF communication nodes.

9. The method of claim 7, wherein the UCMP routing logic is configured external to the plurality of 3GPP RF communication nodes.

10. One or more non-transitory tangible media encoding logic that includes instructions for execution by a processor, wherein the execution causes the processor to perform operations comprising:

upon establishing a long term evolution wireless local area networks radio level integration with internet protocol security tunnel (LWIP) between a first communication network and a second communication network, receiving, at a LWIP controller at the first communication network, a first instrumentation for a user equipment (UE) for the first communication network;

receiving, at the LWIP controller and from the second communication network via the LWIP, a second instrumentation for the UE for the second communication network;

determining, using the first instrumentation at the LWIP controller, a first routing metric associated with the first communication network, wherein the first routing metric identifies a capability of the first communication network to handle an Internet Protocol (IP) flow for the UE;

determining, using the second instrumentation at the LWIP controller, a second routing metric associated with the second communication network, wherein the second routing metric identifies a capability of the second communication network to handle the IP flow for the UE and wherein the second routing metric is different from the first routing metric; and providing network layer load balancing routing for the IP flow by routing, at the LWIP controller, the IP flow for the UE using the first communication network or the second communication network based, at least in part, on the first routing metric and the second routing metric.

11. The media of claim 10, wherein determining the first routing metric further comprises at least one of:

determining at least one of uplink throughput, uplink signal strength information, and uplink signal quality information for the UE for the first communication network;

determining at least one of downlink throughput, downlink signal strength information, and downlink signal quality information for the UE for the first communication network; and determining a load associated with the first communication network.

12. The media of claim 10, wherein determining the second routing metric further comprises at least one of:

determining at least one of uplink throughput, uplink signal strength information, and uplink signal quality information for the UE for the second communication network;

determining at least one of downlink throughput, downlink signal strength information, and downlink signal quality information for the UE for the second communication network; and determining at least one of a load and a channel utilization associated with the second communication network.

13. The media of claim 10, wherein routing the IP flow for the UE further comprises:

calculating a first normalized routing metric based on the first routing metric divided by a sum of the first routing metric and the second routing metric;

calculating a second normalized routing metric based on the second routing metric divided by the sum of the first routing metric and the second routing metric;

setting at least one threshold value based on a larger of the first normalized routing metric or the second normalized routing metric; and calculating a hash of an IP flow tuple value associated with the IP flow for the UE.

14. The media of claim 13, wherein the execution causes the processor to perform further operations, comprising:

selecting either the first communication network or the second communication network to receive the IP flow based on a comparison between the hash of the IP flow tuple value and the at least one threshold value; and routing the IP flow toward a Radio Frequency (RF) communication node of the first communication network or toward a RF communication node of the second communication network based on the selecting.

15. A system comprising:

at least one memory element for storing data; and at least one processor for executing instructions associated with the data, wherein the executing causes the system to perform operations, comprising:

upon establishing a long term evolution wireless local area networks radio level integration with internet protocol security tunnel (LWIP) between a first communication network and a second communication network, receiving, at a LWIP controller at the first communication network, a first instrumentation for a user equipment (UE) for the first communication network;

receiving, at the LWIP controller and from the second communication network, a second instrumentation for the UE for the second communication network;

determining, using the first instrumentation at the LWIP controller, a first routing metric associated with the first communication network, wherein the first routing metric identifies a capability of the first communication network to handle an Internet Protocol (IP) flow for the UE;

determining, using the second instrumentation at the LWIP controller, a second routing metric associated with the second communication network, wherein the second routing metric identifies a capability of the second communication network to handle the IP flow for the UE and wherein the second routing metric is different from the first routing metric; and providing network layer load balancing routing for the IP flow by routing, at the LWIP controller, the IP flow for the UE using the first communication network or the second communication network based, at least in part, on the first routing metric and the second routing metric.

16. The system of claim 15, wherein determining the first routing metric further comprises at least one of:

determining at least one of uplink throughput, uplink signal strength information, and uplink signal quality information for the UE for the first communication network;

determining at least one of downlink throughput, downlink signal strength information, and downlink signal quality information for the UE for the first communication network; and determining a load associated with the first communication network.

17. The system of claim 15, wherein determining the second routing metric further comprises at least one of:

determining at least one of uplink throughput, uplink signal strength information, and uplink signal quality information for the UE for the second communication network;

determining at least one of downlink throughput, downlink signal strength information, and downlink signal quality information for the UE for the second communication network; and determining at least one of a load and a channel utilization associated with the second communication network.

18. The system claim 15, wherein routing the IP flow for the UE further comprises:

calculating a first normalized routing metric based on the first routing metric divided by a sum of the first routing metric and the second routing metric;

calculating a second normalized routing metric based on the second routing metric divided by the sum of the first routing metric and the second routing metric;

setting at least one threshold value based on a larger of the first normalized routing metric or the second normalized routing metric;

calculating a hash of an IP flow tuple value associated with the IP flow for the UE;

selecting either the first communication network or the second communication network to receive the IP flow based on a comparison between the hash of the IP flow tuple value and the at least one threshold value; and routing the IP flow toward a Radio Frequency (RF) communication node of the first communication network or toward a RF communication node of the second communication network based on the selecting.

19. The system of claim 15, wherein the first communication network is a $3^{rd}$ Generation Partnership Project (3GPP) network and the second communication network is a wireless local area network (WLAN) comprising an Internet Protocol (IP) Security Gateway.

20. The system of claim 15, further comprising:

unequal cost multipath (UCMP) routing logic configured for a Radio Access Network (RAN), the RAN comprising a plurality of 3GPP Radio Frequency (RF) communication nodes and a plurality of WLAN RF communication nodes.

\* \* \* \* \*

UNITED STATES PATENT AND TRADEMARK OFFICE
CERTIFICATE OF CORRECTION

PATENT NO. : 10,701,615 B2
APPLICATION NO. : 15/413067
DATED : June 30, 2020
INVENTOR(S) : Mark Grayson et al.

Page 1 of 1

It is certified that error appears in the above-identified patent and that said Letters Patent is hereby corrected as shown below:

On the Title Page

On page 2, in Column 2, under "Other Publications", Line 26, delete "PC/US2018/013766" and insert -- PCT/US2018/013766 --.

In the Drawings

On sheet 5 of 7, in Figure 4, reference numeral 124, Line 1, delete "PROTOCOLSTACK" and insert -- PROTOCOL STACK --.

On sheet 6 of 7, in Figure 5, reference numeral 522, Line 1, delete "PROTOCOLSTACK" and insert -- PROTOCOL STACK --.

In the Claims

In Column 29, Line 12, in Claim 18, after "system" insert -- of --.

Signed and Sealed this
Twenty-fourth Day of January, 2023

Katherine Kelly Vidal
*Director of the United States Patent and Trademark Office*